Patented May 12, 1942

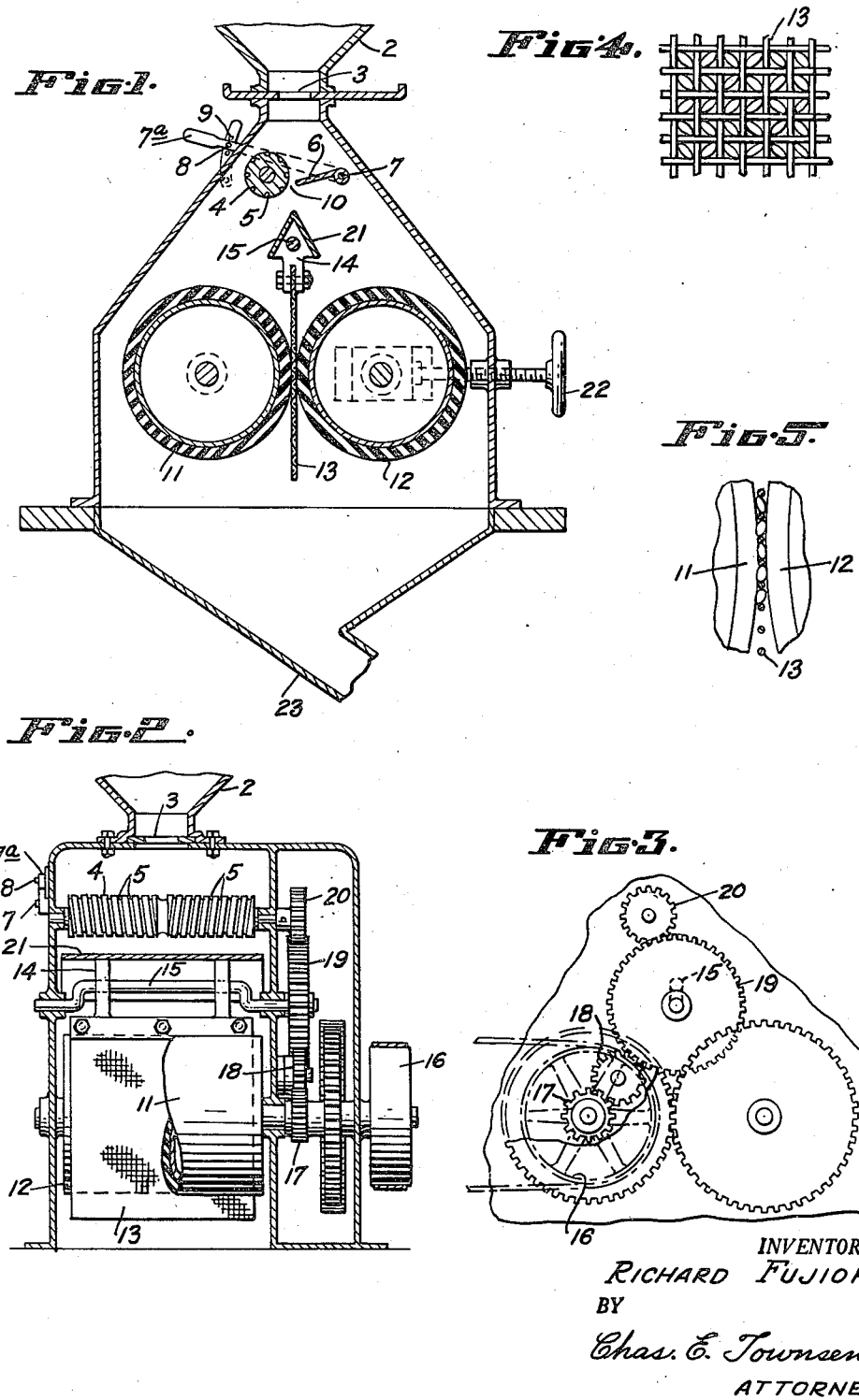

2,282,718

UNITED STATES PATENT OFFICE 2,282,718

RICE HULLING MACHINE

Richard Fujioka, Berkeley, Calif.

Application March 8, 1941, Serial No. 382,407

5 Claims. (Cl. 83—30)

This invention relates to machines for hulling rice, coffee and other like seeds and grains. Its object is to provide a simple practical machine which will effectively remove the hulls from rice and with a minimum of broken grains.

This is accomplished in the present instance through the medium of opposed hulling rollers having grain holding opposed faces of soft rubber and between which rollers there is arranged a screen or reticulated surface which coacts with the roller surfaces to hold the seeds or berries and permit a more positive hulling action without damage to the kernels. This screen may be given a reciprocating up and down motion or a combined reciprocating and oscillatory movement during the hulling operations, thereby insuring better results in passing the rice through the machine, preventing clogging and enhancing the hulling action.

Having reference to the accompanying drawing:

Fig. 1 is a vertical cross section of the hulling mechanism.

Fig. 2 is an elevation in partial section of the apparatus.

Fig. 3 shows a form of gearing for driving the various moving parts.

Fig. 4 is a diagrammatic plain view of the screen showing the rice kernels in the screen pockets.

Fig. 5 is a schematic view of a fragment of the hulling rollers in their operation on the material to be hulled, held by the screen.

A represents any suitable type or form of casing which houses the operating parts of the machine.

The rice or other grain or seeds to be hulled are fed in at the hopper 2; the inflow being regulated by the gates 3. It then falls upon a distributing roller 4 which is provided with right and left helical grooves 5 acting to spread it along a pivoted table 6 mounted on rock shaft 7. The latter carries a handle or arm 7a which is held in adjusted position by suitable means as by a pin 8 fitting in perforations 9. A change in the position of the arm 7a changes the feed opening 10 between the table 6 and roller 4 so as to insure a proper spread and feed of the rice to the hulling mechanism below.

Below the roller 4 and table 6 are a pair of hulling rollers 11—12 having their peripheries covered with rubber or other elastic or compressible material. These rollers are separated sufficiently only for the reception of a screen 13 between them and at the same time insure the proper abrading action of the grain, seeds or berries coming down constantly on both sides of the screen and between it and the adjacent roller faces as to cause the hulls to be acted on by the combined action of the roller and screen to remove the hulls and not injure the berries, seeds or grain being treated. In operation the rubber surfaces of the rollers 11—12 are substantially tangential to the respective adjacent screen surface.

The interstices of the screen are substantially the size of the berries or grain being treated so that while the screen will temporarily act as a shallow pocket to hold the rice the latter can be acted on by both rollers and so more effectively rub and pull at the hull which is to be removed. The screen is preferably hung from a rack member 14 which is mounted for limited oscillation about a crank shaft 15. Distributing roller 5, crank shaft 15 and hulling rollers 11—12 are all given coordinated movement from a suitable source of power represented by the drive pulley 16 through a suitable train of gears 17, 18, 19, 20. The crank shaft 15 runs at much slower speed than the rollers 11—12 or 5 since it is only desired to give the screen a comparatively slow and limited up and down or reciprocating movement between rollers 11—12 to insure the rice being constantly cleaned or freed from the screen; also to prevent excessive wear or abrasion of any one part of the screen. By giving the upper end of the screen support a rocking or oscillating movement, as occurs by the action of the carrier crank shaft 15, and by making the upper edge of rack 14 A-shape as shown at 21, the screen acts as a divider to divert the grain from feed opening 10 alternately to one side and then to the other of the screen.

Suitable means as at 22 are provided to adjust the rollers 11—12 towards and from each other and from the intermediate screen 13 to adapt the machine to the treatment of different sized grains.

If desired, the gear ratios for driving the rollers 11—12 may be varied so that one roller may run faster than the other. As here shown roller 12 has a somewhat slower rotation than roller 11 by reason of the difference in size of its driving gear 17' from that of the companion gear 17.

In operation the material to be hulled, such as rice or other grain or berries, is fed in at the hopper 2 and allowed to fall in regulated quantity onto the distributing roller 4 and table 6; the helical ribs 5 feeding the seeds from the center towards the opposite ends of roller 4 and toward the side edges of table 6. The grain then falls through opening 10, striking the divider 20 and passing to one side or the other of the screen and down between the latter and one or the other of the rollers 11 or 12.

The rice being passed between the rollers and screen is seized between one roller and the dependent screen and partially embedded on the soft face of the roller but held in the screen pockets with sufficient firmness and for a sufficient length of time as to insure the necessary pull of the rubber faced roller against the hull as to remove or loosen the latter.

The screen is so mounted as to be reciprocated or changed up and down continually and thereby to lengthen the life of the screen; and also by alternate movement of the screen upward against the normal path of the rice, the hulling operation is aided by prolonging the rubbing operation.

The screen retards the movement of the rice kernel and subjects it to longer, abrading or rubbing action of the roller.

The screen acts as a reticulated partition between the rollers and the juxtaposition of each to the other is such that the grain passing between the rollers and screen is momentarily held on the shallow screen pockets and given the necessary rubbing action by which the removal of the hulls is greatly accelerated. As seen in Figs. 4–5, the screen openings and the thickness of the screen are such with respect to the nature and size of the substance to be treated, that the grains are really subjected to the action of both the rollers 11—12 while being held in the screen pockets.

The conjoint action of the rubber faced rollers and the screen accomplishes hulling expeditiously and effectively without injury or breaking of the rice kernels as so often occurs where a roller is used with an emery or like abrading surface.

From the rollers 11—12 the removed hulls and cleaned grain drop into a chute 23 and thence conveyed to appropriate points of delivery, separation and such further treatment as may be desired and by mechanism not necessary here to be shown.

What I claim is:

1. In a machine for hulling rice, the combination of a pair of hulling rollers mounted to turn towards each other and with a screen or reticulated partition mounted between them, each roller arranged in approximate tangency to a respective side of the screen, the rollers and screen being arranged in such juxtaposition that grain passing between the rollers and the screen is held in the screen pockets and given a rubbing action by the rollers to remove the hulls.

2. In a rice hulling machine, the combination of a pair of hulling rollers provided with a resilient covering on their peripheries, a screen suspended between the rollers, each roller arranged in approximate tangency to a respective side of the screen, means for turning the rollers towards the screen, and means for giving the screen a reciprocating motion between the rollers.

3. In a rice hulling machine, the combination of a pair of hulling rollers, an intermediate vertically arranged screen coacting with the rollers, each roller arranged in approximate tangency to a respective side of the screen, means for rotating the rollers towards the screen with means for driving one roller at a faster surface speed than the other roller, and means for giving the screen a vertical reciprocating motion between the rollers.

4. In a rice hulling machine, the combination of a pair of hulling rollers, an intermediate vertically arranged screen coacting with the rollers, each roller arranged in approximate tangency to a respective side of the screen, means for rotating the rollers towards the screen with means for driving one roller at a faster surface speed than the other roller, and means for giving the screen a combined reciprocating and oscillating motion between the rollers.

5. In a rice huller, the combination of a pair of hulling rollers, a screen disposed between the rollers and in cooperative hulling relation thereto, the screen having interstices of approximately the size of the grain to be hulled, said screen having a divider arranged at its upper edge with means for operating the divider alternately to distribute the incoming grain to be hulled to one side or the other of the screen, a horizontally disposed distributor roller arranged above the divider, and a cooperating spring-pressed table forming with the distributor roller a feed opening by which the incoming material is delivered to the divider and said distributer roller having right and left spirally disposed ribs on its surface.

RICHARD FUJIOKA.